March 25, 1958     J. R. OISHEI     2,827,652
WASHER SYSTEM

Filed April 20, 1954                                                    2 Sheets-Sheet 1

INVENTOR.
John R. Oishei
BY
Bean, Brooks, Buckley & Bean,
ATTORNEYS.

March 25, 1958  J. R. OISHEI  2,827,652
WASHER SYSTEM

Filed April 20, 1954  2 Sheets-Sheet 2

INVENTOR.
John R. Oishei
BY
Beau, Brooke, Buckley & Beau,
ATTORNEYS.

United States Patent Office 2,827,652
Patented Mar. 25, 1958

2,827,652

WASHER SYSTEM

John R. Oishei, Buffalo, N. Y., assignor to Trico Products Corporation, Buffalo, N. Y.

Application April 20, 1954, Serial No. 424,376

14 Claims. (Cl. 15—250.4)

This invention relates to a windshield cleaning system and particularly to one utilizing a foot actuated washer for applying a liquid solvent to a windshield surface for being spread thereover by its oscillating wiper. It has heretofore been proposed to squirt or spray a liquid solvent onto a windshield by means of a pedal collapsed bulb or bellows and, through a mechanical connection to the windshield cleaner control, to actuate the wiper concurrently with such application of the solvent. The mechanical connection was such as to arrest or park the wiper substantially at the time of or with the stoppage of the solvent application with the result that the vision through the windshield might be somewhat blurred by a remaining film or droplets of the solvent.

One of the objects of the present invention is to provide a foot actuated windshield cleaning system of this character in which the wiper operation is prolonged for a predetermined interval beyond the washing cycle to insure the windshield surface within the field of vision being wiped substantially dry and free of any remaining solvent which may tend to obscure clear vision through the shield.

Again, with the use of a foot actuated washer arrangement utilizing a collapsible bellows or elastic bulb, the solvent capacity has been limited to a degree which would be insufficient to thoroughly or properly wet the surface area within the path of the wiper, the result being a partially washed clouded area acting to befog the field of vision.

It is therefore a further object of this invention to provide a windshield clearing system in which the foot actuated washer unit has a capacity adequate for the thorough washing of that portion of the windshield surface traversed by the wiper.

In accordance with the present invention there is associated with the pedal actuated washer a snubbing unit designed for retarding the return movement of the pedal connection to the windshield wiping unit so as to maintain the wiper operative for a given time interval following the spray application. The snubbing unit embodies the principle of bleeding air into an expanding chamber, which chamber is utilized to increase the capacity of the pump. In other words, a dual chambered pump is provided, one chamber serving purely as a pumping or displacing chamber and the other chamber functioning in a further capacity as a snubbing chamber, the two chambers being collapsible by a pedal arrangement serving to accommodate the snubbing action while at the same time permitting the pumping chamber to more rapidly take in its next charge of solvent. The result is should it be necessary to tread the pedal again the motorist is assured of having a fresh supply of the solvent in adequate volume to be useful for the intended purpose.

The present invention therefore has for a further object to provide a windshield cleaning system that utilizes a pedal actuated washer unit having a pumping section and a snubbing section differentially controlled by the actuating pedal so as to continue the wiper operation for a given interval after the completion of the solvent application and during this interval to replenish the pump section with a new charge of solvent ready for another pedal demand.

The foregoing and other objects will manifest themselves as this description progresses, reference being made therein to the accompanying drawings, wherein Fig. 1 is a schematic showing of a windshield cleaning system of the present invention installed upon a vehicle;

Figure 1:
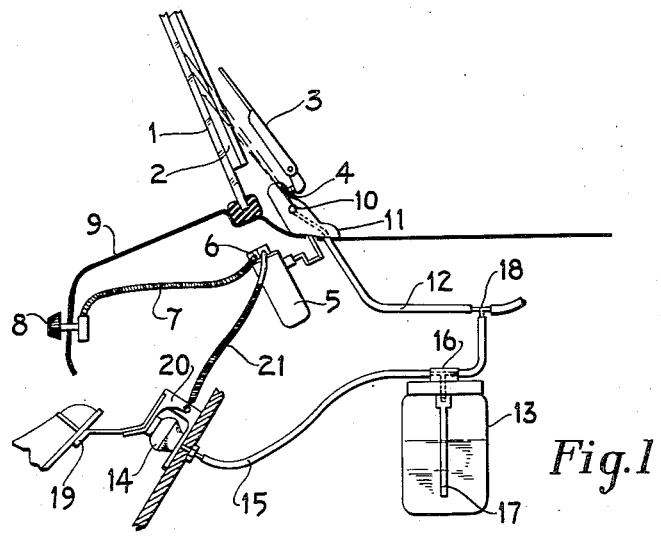
Figure 2:
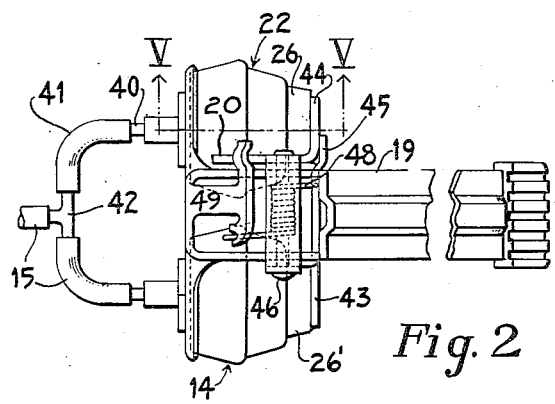
Fig. 2 is a plan view of the pump and snubber assembly of the washer.
Figure 3:
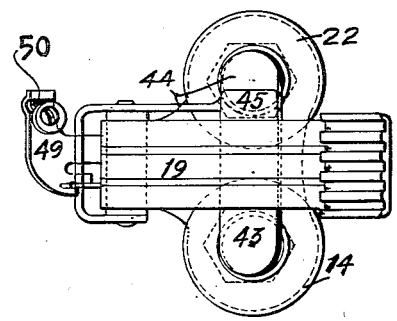
Fig. 3 is a front end elevation of the assembly.
Figure 4:
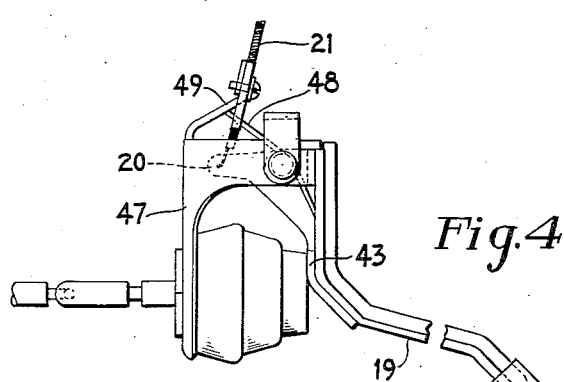
Fig. 4 is a side elevation of the assembly.

Referring more particularly to the drawings, the numeral 1 designates the windshield of a motor vehicle, 2 a wiper, 3 its actuating arm, 4 its rockshaft, and 5 its power unit, such as a suction motor having a control valve 6 which may be made conveniently accessible by a Bowden wire or cable 7 and a hand knob 8 on the instrument panel 9. A washer nozzle 10 is mounted adjacent the windshield, as on the shaft supporting housing 11, and is connected by a conduit 12 to a reservoir 13 containing a supply of liquid solvent. A bellows type of pump in the form of a rubber or elastic bulb 14 is connected by a conduit 15 to the nozzle conduit 12 by a T coupling 16 valved to permit the inlet stem 17 to intake liquid as the bellows 14 expands and to express the liquid charge out through the conduit 12, the nozzle 10, and to the windshield in the path of the oscillating wiper 2. A T branch 18 in the conduit 12 leads off to a second washer nozzle adjacent a companion wiper in a well known manner. The bellows or elastic bulb is collapsed by a pedal 19 which has a rocker arm 20 that is joined to the wiper motor control valve 6 by a Bowden wire 21, the action being that when the pedal is depressed to squirt water or other solvent onto the windshield the wiper motor will also be energized to move the wiper back and forth in the presence of the solvent spray, and when the foot pressure is released the pedal will return under the urge of the elastic bulb, with or without the aid of a spring, to a normal position of rest for both the wiper and the bulb. During this cycle the bulb refills itself for the next pedalling cycle.

The foregoing structure is generally disclosed in my Patent No. 2,743,473. The bellows or bulb type of washer pump has heretofore been of limited capacity. A further limitation has been the inability to continue the wiper operation after the completion of the solvent application.

In accordance with the present invention, the wiping action is prolonged after the cessation of the solvent delivery. As in the earlier disclosure, the wiper is set in operation by and upon the depression of the pedal but herein means are provided to delay the arresting and parking of the wiper for a predetermined time interval following the release of the pedal, thereby to enable the wiper to dry the field of vision through the windshield substantially free of any vision-blurring film of moisture. To this end, a time-delay device is associated with the wiper control. In the illustrated embodiment of Figs. 1 through 5, this device comprises a second bulb or bellows 22 which incloses a return or bulb-expanding spring 23 that rests at one end upon a supporting shoulder 24 inside the tubular anchoring sleeve 25 and bears at its opposite end on the inner face of the pressure pad 26, or on an interposed wear plate 27. Foot pressure, if applied to the pad 26, will collapse the bellows by pushing the pad back into the self-sustaining cupped base portion 28 to displace a major portion of the fluid content from the bulb chamber 29. An annular outlet valve 30 which is arranged within the anchoring sleeve 25 is yieldably held by a coil spring 31 against the underside of the internal shoulder 24 as a seat therefor.

Extending axially through the annular valve is a stem 32 of an inlet valve 33 which is slidably connected to the wear plate by a link 34. This link is slidable through the plate and has an enlarged head 35 to prevent its detachment. When the bulb is collapsed, the spring 23 is likewise compressed and the inlet valve is seated upon the annular outlet valve to close its central opening. Thereafter, the link 34 will slide in the wear plate 27 until the latter abuts the inner end of the sleeve 25 which is formed with a bulb-anchoring flange 36. During the depression of the pressure pad 26, the fluid content of the bulb chamber will be expelled as it momentarily unseats the outlet valve against its spring 31. A disk 37 is fixed on the outer end of the valve stem 32, and interposed between this disk and the outer side of the annular valve 30 is a spring 38 that not only resiliently supports the valve stem but primarily acts initially to retard or snub the functioning of the primary spring 23 while the inlet valve remains seated until the slack has been absorbed in the play connection between the link 34 and the wear plate. Thereafter, the inlet valve will unseat to permit a freer ingress of fluid into the more rapidly expanding bulb chamber which fluid up until now has restrictedly entered through one or more bleed passages 24' formed in the outlet valve seat. This snubber functions somewhat similarly to a dashpot and permits a rapid depression of the pedal and a retarded return.

This snubbing action during the expanding cycle of the bulb serves to continue the wiping action of the windshield cleaner for a predetermined number of strokes of the wiper after the water delivery has stopped. The fluid may be air in which event the anchoring sleeve 25 will open at its outer end directly into the atmosphere and the bleed passage 24' will be exceedingly small. For practical reasons, a liquid fluid is preferred over gas as the bleeding action is more easily regulated and controlled. With this in mind, the outer end of the anchoring sleeve is closed by a fitting 39 having a nipple 40 for a hose 41 connecting to a T branch 42 in the conduit 15. This gains a further advantage in that the liquid solvent can be used as the snubbing fluid in the snubber 22—40 and thereby increase the capacity of the bellows pump to that extent.

Both bulbs 14 and 22 may be identical and, therefore, when the pedal is depressed they will be simultaneously collapsed to discharge a double quantity of the solvent onto the windshield. However, after the foot pressure is removed, the pump bellows will expand more rapidly than the snubbed bellows. To permit this differential expansion, the pedal is constructed with a fixed lug 43, bearing upon the pressure pad 26' of the pump bulb 14, and a relatively movable lug 44 bearing upon the pad 26 of the snubber bulb 22. The lug 44 is yieldably held by its bulb against an overhanging abutment 45 from the fixed lug by reason of which the dual bulb collapse is effected. The lug 44 is mounted by the same pivot pin 46 that supports the pedal 19 on the bracket 47, a spring 48 coiling about the pin and having one end anchored on a bracket part 49 and its other end acting on the pedal to elevate the same. A seat 50 on the bracket part serves to anchor the Bowden wire 21 in functioning position. The wiper actuating rocker arm 20 is fixedly related to the lug 44 to move therewith. Consequently, after the foot pressure is removed from the pedal, the pump bellows 14 will rapidly fill with the liquid, being unhindered by the snubber, and will carry the pedal with it to separate the abutment 45 from the snubber lug 44. The rocker arm 20, likewise being retarded, will not shut off the wiper motor control valve 6 during this belated interval until the inlet valve 33 is unseated. During this interval the pump bellows will refill, ready for the next pedal demand even though the wiper is yet in operation. Thus, it is possible to repeatedly use the pump bellows without an interruption in the wiping action by redepressing the pedal in time and before the inlet valve unseats. This affords an opportunity to thoroughly wet the beclouded surface of the windshield without unnecessary wear on the wiping mechanism.

Figure 5:
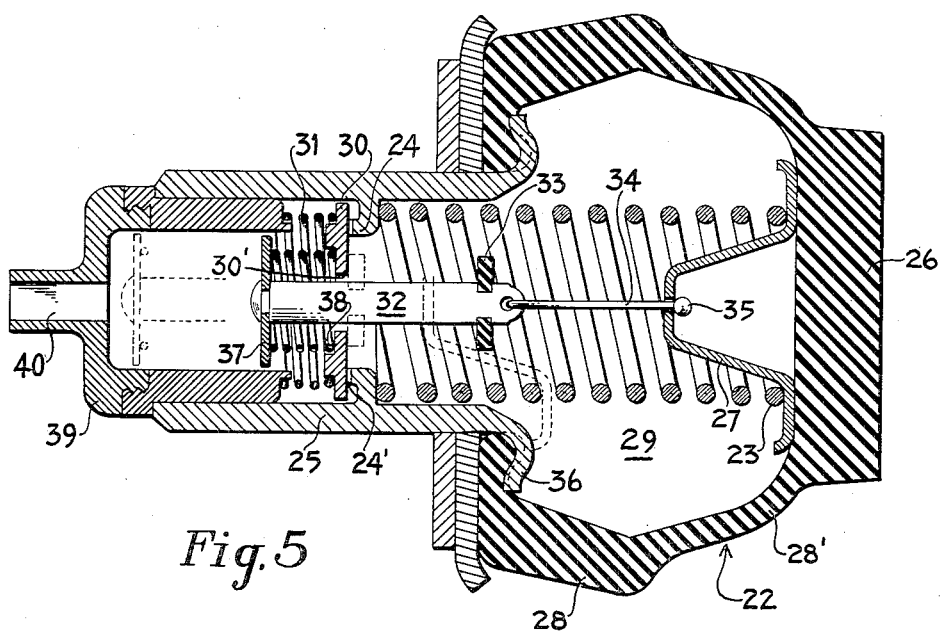
Fig. 5 is a longitudinal sectional view through the snubber unit.
Figure 6:
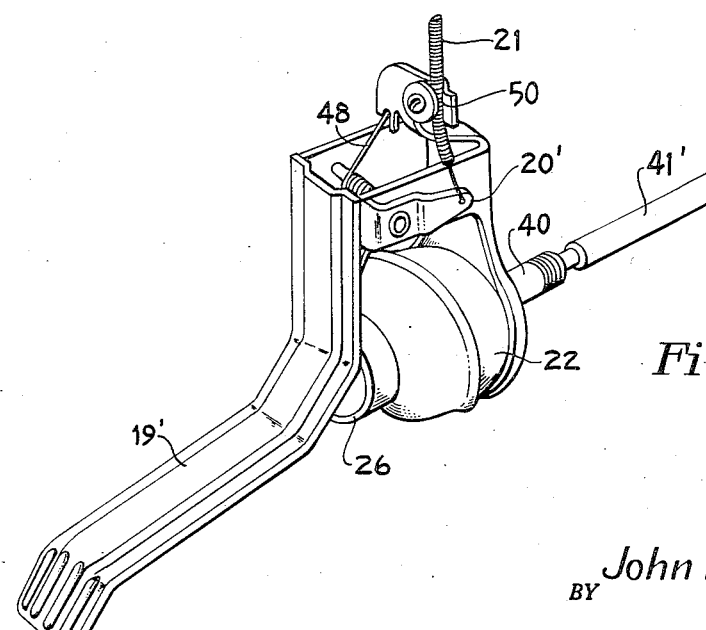
Fig. 6 is a perspective view of a modified assembly.

In lieu of the dual bellows arrangement, a single bellows may be applied as shown at 22 in Fig. 6, such bellows being constructed with the snubbing action as shown in Fig. 5 so that when the pedal 19 is depressed against the pressure pad 26 it will collapse the bellows chamber to force the solvent out through the nipple 40 and the connected hose 41' which in this instance will be connected directly to one or both of the nozzles 10. During this depression the rocker arm 20' which is fixed directly upon the pedal will push upon the Bowden wire 21 to turn on the wiper motor 5. Upon the removal of the foot pressure the pedal will be restored by the urge from spring 48 and the bellows or bulb will expand under the action of the spring 23 in a retarded manner as determined by the bleed 24' until the slack in the connecting linkage has been absorbed whereupon the inlet valve 33 will be unseated to admit the inflowing liquid more rapidly to accelerate the bellows expanding action.

In both forms of the invention the wiper will continue its operation for a stated interval after the termination of the solvent spray, the advantages of the dual bellows embodiment over the single bellows embodiment of Fig. 6 being, firstly, that the pump has a greater solvent capacity to more thoroughly wet and flood the windshield surface and, secondly, the pump bellows is free to take in a new charge of the solvent immediately and unhindered by the retarded bellows. Each bellows has a relatively thin distensible wall section 28' which is adapted to be distended under the hydrostatic pressure developed by a quick depression of the pedal, and to take advantage of this distended wall to prolong the period in which the solvent is being applied to the windshield, the pedal 19 (19'), will be held depressed to its fullest extent, for a predetermined time interval. Thereafter, and by reason of the play connection between the relatively movable parts 44 and 45 of the pedal, the release of the pedal will permit the bellows 14 to rapidly refill but the refilling of the companion bellows 22 will be retarded to continue the wiping cycle for a while after the completion of the washing cycle and until the wiper is finally parked. The plural bellows are self-expanding, with the snubbing one refilling slower than the free bellows to prolong the wiping action beyond the washing cycle. The central opening 30' of the outlet valve constitutes an inlet port for the snubbing bellows to be closed by the inlet valve 33 during the interval when the bleed passages 24' function. The system is simple and durable in construction and insures a clean field of vision after a thorough washing followed by a dry wiping cycle.

The foregoing description has been given in detail without thought of limitation since the inventive principles are capable of assuming other physical embodiments without departing from the spirit of the invention and the scope of the appended claims.

What is claimed is:

1. A windshield cleaning system comprising a wiper and a motor for operating the same having a control, a reservoir for holding a liquid solvent, means for applying the solvent to an associated windshield surface in the path of the wiper; and a foot actuated liquid displacing unit in the form of a pair of elastic bellows each connected by an inlet passage to the reservoir and by an outlet passage to the applying means, means including a pedal for acting upon said pair of bellows to collapse them concurrently for ejecting their liquid content jointly through the applying means, a power transmitting member operatively connecting the pedal to the motor control and operable automatically to actuate the wiper concurrently with the collapsing of both bellows, said power transmitting member being operable to arrest the wiper upon predetermined expansion of one of said bellows, and snubber means connected to said one bellows to retard the intake both of liquid thereinto from the reservoir thereby to continue the wiper actuation for a time interval to wipe the windshield surface after the functioning of the applying means.

2. A windshield cleaner having a wiper, a motor for operating the same, and a control for the motor; and a washer having a solvent containing reservoir and a connected pump unit including a bellows, and a connected pedal depressible to collapse the bellows to apply solvent to an associated windshield surface, spring means operable to expand the bellows for taking in solvent from the reservoir when the pedal is released, a push-pull connection between the pedal and the wiper motor control for moving the latter to energize the wiper when the pedal is depressed and to arrest the wiper upon return of the pedal, and snubber means acting on the pedal, for retarding the return of the pedal after its release thereby to continue the wiper operation after the termination of the solvent application.

3. A windshield cleaning system comprising a wiper and a motor for operating the same and having a control, means for applying a liquid solvent to an associated windshield surface in the path of the wiper; a reservoir for holding a liquid solvent; and a foot actuated liquid displacing unit in the form of a pair of elastic bellows each connected by an inlet passage to the reservoir and by an outlet passage to the applying means, a depressible pedal for acting upon the two bellows to collapse them concurrently for ejecting their liquid content through the applying means, a mechanical connection between the control and the pedal and operable automatically to actuate the wiper concurrently with the collapsing of the bellows and to arrest the wiper upon the return of the pedal, said connection having a play connection with one of said bellows to accommodate differential expansion of the two bellows, and snubber means connected to said one bellows to retard the inflowing of liquid thereinto and thereby prolong the wiper actuation for a time interval following the collapse of the bellows to wipe the surface after the functioning of the applying means.

4. A windshield washer comprising a solvent containing reservoir, solvent applying means, plural self-expanding bellows interconnected with the reservoir and the applying means to intake solvent from the former and to discharge it from the latter, and a pedal common to the plural bellows and acting to collapse them jointly, said pedal having relatively movable parts each associated with a respective bellows and operable to enable differential expansion of the plural bellows.

5. A windshield washer comprising a solvent containing reservoir, solvent applying means, plural self-expanding bellows interconnected with the reservoir and the applying means to intake solvent from the former and to discharge it from the latter, dashpot means associated with one bellows to retard its expansion after being collapsed, and pedal means common to both bellows to collapse them concurrently and embodying a yieldable part cooperating with said one bellows to follow its retarded expansive movement, said pedal means having a second part foot actuated and cooperating with the other bellows to follow its relatively freer expansive movement, said yieldable part having a wiper coordinating arm adapted for operative connection to a windshield cleaner control.

6. A wiper-coordinating windshield washer comprising a pump having a chamber with inlet and outlet means and a fluid displacing member movable in one direction to ensmall the chamber, spring means acting to restore said displacing member, valve means opening for rapid fluid displacement from said chamber, said valve means closing upon restoring movement of said member and having a bleed passage therearound for retarding the spring action, and a wiper-controlling member associated with and responsive to the movement of said fluid displacing member.

7. A windshield cleaner and washer assembly comprising a pump having a collapsible bellows with inlet and outlet means, wiper means operable upon collapsing said bellows and arrested upon expansion thereof, a bellows-expanding spring arranged within said bellows, outlet valve means opening for rapid evacuation of the fluid content of said bellows, inlet valve means closed upon collapsing said bellows, and a bleed passage into the bellows around said inlet valve means to retard initially the wiper arresting expansion of the bellows under said urge of the spring, said inlet valve means having a play connection with said bellows for opening the valve after predetermined bellows expansion for accelerating the bellows expansion to quickly arrest the wiper means.

8. A windshield cleaner and washer assembly comprising a pump having a foot actuator with a discharge stroke and an intake stroke, power actuated wiper means having a control, a mechanical connection between the actuator and the control for moving the latter to start the wiper means in operation on the discharge stroke and for arresting the wiper means toward the end of the intake stroke, and snubber means operable to retard the initial portion of the intake stroke to prolong the operation of the wiper means.

9. A windshield cleaner and washer assembly comprising a pump having a foot actuator with a discharge stroke and an intake stroke, power actuated wiper means having a control, a mechanical connection between the actuator and the control for moving the latter to start the wiper means in operation on the discharge stroke and for arresting the wiper means toward the end of the intake stroke, snubber means operable to retard the initial portion of the intake stroke to prolong the operation of the wiper means, a second pump in the form of a bellows having a discharge common with the first pump, and a pedal common to both pumps to operate them concurrently, the second pump having a freer expansive movement than the retarded pump.

10. A windshield cleaner and washer assembly comprising a pump in the form of a bellows and having an actuator with a discharge stroke and an intake stroke, power actuated wiper means having a control operatively connected to the pump to start the wiper means on the discharge stroke and to arrest the wiper means toward the end of the intake stroke, snubber means operable to retard the intake stroke to prolong the operation of the wiper means, a second pump in the form of a bellows having a common discharge with the first pump, and a pedal having relatively movable parts jointly operable to concurrently collapse both bellows, one part acting upon first bellows and the other part acting on the second bellows and having a play connection with the first part to accommodate the differential expanding movements of the two bellows.

11. A windshield cleaning system comprising a wiper, means for applying a liquid solvent to an associated windshield surface in the path of the wiper; a reservoir for holding a liquid solvent; and a foot actuated liquid displacing unit in the form of a pair of elastic bellows each connected by an inlet passage to the reservoir and by an outlet passage to the applying means, a pedal having two parts depressible as a unit to collapse the two bellows concurrently for feeding the solvent to the applying means, said two parts movable relatively to each other during the return movement of the pedal to permit the two bellows to expand differentially, and retarding means connected to one bellows and operable to retard its expansive refilling action relative to the refilling action of the other bellows.

12. A windshield cleaning system comprising a wiper, means for applying a liquid solvent to an associated windshield surface in the path of the wiper; a reservoir for holding a liquid solvent; and a foot actuated liquid displacing unit in the form of a pair of elastic bellows one connected by an inlet passage to the reservoir and by an outlet passage to the applying means, a pedal having two parts depressible as a unit to collapse the two bellows concurrently for feeding the solvent from said one bellows to the applying means, said two parts movable relatively to each other during the return movement of the pedal to permit the two bellows to expand differentially, and retarding means connected to the other bellows and operable to retard its expansive action to extend the wiping operation while said one bellows is refilling.

13. A windshield cleaner and washer assembly comprising a pump having a foot actuated part movable in one direction on a discharge stroke and in the opposite direction on an intake stroke, power actuated wiper means having a control operatively connected to said part for being moved thereby on said discharge stroke to start said wiper means and for being restored thereby on said intake stroke to arrest said wiper means, and snubber means operable to retard said pump on its intake stroke compared to said discharge stroke thereby to delay the arrest of said wiper means.

14. A windshield cleaner and washer assembly comprising a pump having a foot actuated part movable in one direction on a discharge stroke and in the opposite direction on an intake stroke, power actuated wiper means having a control operatively connected to said part for being moved thereby on said discharge stroke to start said wiper means and for being restored on said intake stroke to arrest said wiper means, and snubber means operable to retard said pump initially on its intake stroke compared to said discharge stroke thereby to delay the arrest of said wiper means, said snubber means including means to release said pump during the final portion of said intake stroke thereby to accelerate the intake stroke for the movement of said control to its wiper arresting position.

References Cited in the file of this patent

UNITED STATES PATENTS

| 2,162,985 | West | June 20, 1939 |
|---|---|---|
| 2,702,918 | Neufeld | Mar. 1, 1955 |

FOREIGN PATENTS

| 465,681 | Canada | June 6, 1950 |